United States Patent Office 3,418,184
Patented Dec. 24, 1968

3,418,184
SMOKE PRODUCING PROPELLANT
Ronald F. Vetter, China Lake, Calif., assignor to the United States of America as represented by the Secretary of the Navy
No Drawing. Continuation-in-part of application Ser. No. 380,709, July 6, 1964. This application Jan. 16, 1968, Ser. No. 698,100
3 Claims. (Cl. 149—19)

ABSTRACT OF THE DISCLOSURE

A smoke producing composition particularly for use in influencing the weather. It comprises a mixture of Butarez CTL II, MAPO, trimethylol ethane trinitrate and aluminum preferably loaded with silver iodate.

The invention herein described may be manufactured and used by or for the Government of the United States of America for governmental purposes without the payment of any royalties thereon or therefor.

This invention is a continuation-in-part of patent application Ser. No. 380,709, filed in the U.S. Patent Office on July 6, 1964, now abandoned.

In recent years many compositions and methods for cloud seeding to cause rainfall for any purpose, such as diminishing or destroying a hurricane, have been developed. Burner type generators utilizing solutions of silver iodide or lead iodide in a volatile, flammable solvent have been used for dispersing or precipitating fogs and clouds. "Nitrasol" based formulations containing silver iodate or other suitable oxidized salts have been successfully tried. "Nitrasol" is a name for propellants whose binders are plastisols of nitrocellulose in a nitrate plasticizer. Nitrocellulose is converted into tiny, hard, dense spheres which are then dissolved at elevated temperatures in the plasticizer to form a rubbery binder. Although these cloud seeding materials and the method of using them have produced varying degrees of precipitation, they have not proved entirely satisfactory for the conditions to which they were to be applied. Generally the output levels of seeding material has been low and thus efficiency has been impaired. Units carrying the solution type materials and devices for dispersion must be mounted with extensive auxiliary equipment which greatly hampers versatility. Use of the "Nitrasol" type material is expensive and because it is sensitive formulation it is dangerous to handle and particularly in airborne application to any type thunderstorm. The compositions which have been previously used in artifically influencing the weather generally have had poor cure properties, inhibiting and charge configuration limitation, and low percentage solids. The present invention provides a composition which embraces all the advantages of similarly employed formulations and possesses none of the aforementioned disadvantages.

It is therefore an object of this invention to provide a composition which disperses a high percentage of silver iodide or similar type crystals as a cloud seeding element thereby increasing the volume of precipitation.

Another object is to provide a non-detonable composition for use in cloud seeding which enhances safety of handling.

Yet another object of this invention is to provide a propellant composition which may be safely cured at high temperatures and still be capable of efficient cure at low temperatures.

Still another object is to provide a propellant composition which has lessened shrinkage upon cure, making feasible case-bonded, end-burning configurations of various sizes and shapes.

A further object of this invention is to provide a propellant composition with improved thermal stability.

A still further object of this invention is to provide a propellant composition with improved physical properties.

Other objects and many of the attendant advantages of this invention will be readily appreciated as the same becomes better understood by reference to the following detailed description. The examples given are illustrative of this invention and should not be considered limiting.

The present propellant composition comprises the following ingredients: a rubbery copolymeric resin selected from the group consisting of polybutadiene acrylic acid copolymer, carboxylated linear polybutadiene, polybutadiene-acrylic acid-acrylonitrile terpolymer and other like resins crosslinked and extended with such catalysts as tris[1-(2 methyl) aziridinyl] phosphine oxide, phenylbis[1-2(methyl)aziridinyl] phosphine oxide and other polyimines and polyepoxides capable of reacting with the resins mentioned hereinbefore to form solid rubber-like plastics; a plasticizer selected from the group consisting of trimethylol ethane trinitrate, diethyl phthalate, dioctyl phthalate, non functional polybutadiene, pentaerythritol trinitrate, and triethylene glycol dinitrate; a metal fuel selected from the group consisting of aluminum, magnesium, beryllium lead and silver; and an oxidized salt selected from the group consisting of silver iodate, ammonium iodate, silver nitrate, lead nitrate, and iodine pentoxide. Percentages of these ingredients may vary over wide ranges, but stoichiometry must be calculated so that combustion of the composition yields energy sufficient to exhaust ions, molten or solid particles and gases for maximum dispersion.

Formulations comprising 75 to 90 percent by weight silver iodate, 1.5 to 10 percent by weight aluminum, 6 to 15 percent by weight binder consisting essentially of carboxylated linear polybutadiene and tris[1-(2 methyl) aziridinyl] phosphine oxide adjusted so that imine to carboxyl ratio is 1:1, and up to 5 percent trimethylol ethane trinitrate were prepared and tested. They were found to yield large quantities of silver iodide and were designated for future use.

The following examples are typical of the present invention that yield larger quantities of silver iodide than the Nitrasol formulation previously used.

EXAMPLE I

| Ingredients: | Percent by weight |
|---|---|
| Silver iodate (crystalline particles) | 89.0 |
| Aluminum (atomized powder) | 1.50 |
| Butarez CTL II [1] | 6.802 |
| MAPO [2] | 0.198 |
| TMETN [3] | 2.50 |

[1] Butarez CTL II is the trade name for a linear carboxylated polybutadiene resin. This resin is a liquid, controlled-structure polymer of butadiene characterized by the presence of carboxy end-groups on both ends of the polymer chain shown structurally as follows:

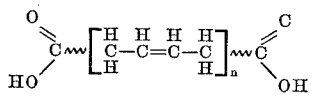

It has a relatively narrow molecular weight distribution and lacks crystallizability which allows cured compositions of the polymer to remain rubbery down to very low temperatures. The resin's properties include from 1.1 to 1.4 carboxyl content, 0.05 maximum moisture, 0.05 maximum ash, 0.89 to 0.92 specific grainty and 230 to 350 poise viscosity at 77° F.
[2] MAPO is the trade name for tris[1-(2-methyl)aziridinyl] phosphine oxide.
[3] TMETN is short for trimethylol ethane trinitrate.

EXAMPLE II

| Ingredients: | Percent by weight |
|---|---|
| Silver iodate (crystalline particles) | 90.0 |
| Aluminum (atomized powder) | 1.5 |
| Butarez CTL II [1] | 5.83 |
| MAPO [2] | 0.17 |
| TMETN [3] | 2.5 |

[1,2,3] defined in example I above.

EXAMPLE III

| Ingredients: | Percent by weight |
|---|---|
| Silver iodate (crystalline particles) | 87.50 |
| Aluminum (atomized powder) | 3.50 |
| Butarez CTL II [1] | 6.316 |
| MAPO [2] | 0.184 |
| TMETN [3] | 2.50 |

[1,2,3] defined in Example I.

EXAMPLE IV

| Ingredients: | Percent by weight |
|---|---|
| Silver iodate | 80 |
| Aluminum | 5 |
| Binder | 11.5 |
| Butarez CTL II [1] | 11.14 |
| MAPO [2] | .36 |
| TMETN [3] | 3.5 |

[1,2,3] defined in Example I.

Formulations were prepared without the metal, but on test firing a large amount of silver and silver iodide slag remained. Since it was known that the higher flame temperatures were supplied by metal fuel, the above formulations were prepared and tested and no measurable amount of slag remained.

Table I herein is a comparison of the physical properties of three examples of the new formulation with a typical Nitrasol formulation which had previously been successfully used. The Nitrasol formulation and ingredients are very sensitive and present handling hazards, whereas, the new formulations have shown no indication of detonation wave propagation and are safe to handle. All normal drop tests were negative and in a no-fire-flight test from 40,000 feet altitude the unit carrying the new formulation impacted the range shattering the unit and the propellant, which partially burned with ignition from an undetermined source. Gap detonation tests were made on the new formulations using two 2-inch-diameter, 1-inch-thick tetryl pellets detonated by No. 3 blasting cap against the sample in a 5½-inch-long, 1½-inch-(steel) pipe with a witness plate on top. They were negative.

Thus the combination of silver iodate, a smoke producing vehicle (rubbery copolymer and plasticizer) and metal powder fuel provided an improved smoke-producing formulation. The metal fuel in this new formulation is probably responsible for producing smaller dispersion particles of nucleating material than those formulations without this ingredient.

Obviously many modifications and variations of the present invention are possible in the light of the above teachings. It is therefore to be understood that within the scope of the appended claims the invention may be practiced otherwise than as specifically described.

What is claimed is:

1. A smoke producing propellant formulation comprising the following ingredients:

| Ingredients: | Percent by weight |
|---|---|
| Silver iodate | 75–90 |
| Aluminum | 1.5–10 |
| Trimethylol ethane trinitrate | 0–5 |
| Binder | 6–15 | said binder consisting of a mixture carboxylated linear polybutadiene having carboxy end-groups present on both ends of the polymer chain and tris[1-(2 methyl) aziridinyl]phosphine oxide in a ratio adjusted so that imine to carboxyl is 1:1.

2. A smoke producing propellant formulation comprising the following ingredients:

| Ingredients: | Percent by weight |
|---|---|
| Silver iodate | 87.50 |
| Aluminum | 3.50 |
| Carboxylated linear polybutadiene having carboxy end-groups present on both ends of the polymer chain | 6.316 |
| Tris[1-(2 methyl)aziridinyl]phosphine oxide | 0.184 |
| Trimethylol ethane trinitrate | 2.50 |

3. A smoke producing propellant formulation comprising the following ingredients:

| Ingredients: | Percent by weight |
|---|---|
| Silver iodate | 80 |
| Aluminum | 5 |
| Trimethylol ethane trinitrate | 3.5 |
| Binder | 11.5 | said binder consisting essentially of 11.14 percent by weight carboxylated linear polybutadiene having carboxy end-groups present on both ends of the polymer chain and 0.36 percent by weight tris[1-(2 methyl) aziridinyl]phosphine oxide.

TABLE I.—COMPARISON OF PHYSICAL PROPERTIES OF NEW FORMULATION (EXAMPLES I, II AND III) WITH TYPICAL NITRASOL FORMULATION (EX. N)

| Formulation | Elongation at maximum tensile strength, percent | Elongation at rupture, percent | Maximum tensile strength, p.s.i. | Modulus at 10% elongation | Burning rate, in./sec. | | | Heat of explosion, cal./g. | Density, g./cc. | Residue of burning theor. maximum, percent AgI |
|---|---|---|---|---|---|---|---|---|---|---|
| | | | | | 120 p.s.i.g. | 535 p.s.i.g. | 1,065 p.s.i.g. | | | |
| Ex. N | 6 | | 110 | *2,000 | .058 | .179 | .469 | 500 | 3.0 | 55 |
| Ex. I | 20 | 24 | 105 | 86 | .125 | .245 | .364 | 497 | 4.0 | 74.6 |
| Ex. II | 10 | 15 | 105 | 1,030 | .121 | .223 | .277 | 514 | 4.0 | 72.6 |
| Ex. III | 21 | 24 | 52 | 385 | .107 | .192 | .253 | 438 | 3.9 | 73 |

*Secant Modulus.

In preparing these formulations vertical mixers were used. Batch sizes varied from 16 to 1600 pounds. The mixing procedure involved degassing the liquid ingredients for ten minutes in the mix can, followed by incremental or continuous additions of solids. The catalyst was generally added last to the batch and final mixing was accomplished under vacuum. The final cycle time varied from a minimum of 20 minutes to a maximum of 30 minutes. The material was cast from a pressurized pot through a bottom casting valve. End-burning grains were cast and cured at about 135° F. Curing was generally for periods over 200 hours, but the physical properties were sufficient after 70 hours.

References Cited

UNITED STATES PATENTS

| | | | |
|---|---|---|---|
| 2,995,526 | 8/1961 | De Ment | 149—81 X |
| 3,046,168 | 7/1962 | Burkardt et al. | 149—42 |
| 3,140,207 | 7/1964 | Williams et al. | 149—19 |
| 3,147,161 | 9/1964 | Abere et al. | 149—19 |
| 3,305,523 | 2/1967 | Burnside | 149—19 X |

BENJAMIN R. PADGETT, *Primary Examiner.*

U.S. Cl. X.R.

149—38, 42, 75